United States Patent [19]

Pietzsch et al.

[11] 4,434,494
[45] Feb. 28, 1984

[54] CONTACT ELECTRODE FOR MELTING AND HEATING FURNACES WITH DC PLASMA HEATING

[76] Inventors: Herbert Pietzsch, Niederhäslicher Str. 27, DDR-8210 Freital; Walter Lachner, Schlüterstr. 20, DDR-8021 Dresden; Karlheinz Hofmann, Waldblick 17; Erich Pötzsch, Friedrich-Engels-Str. 25a, both of DDR-8210 Freital; Fred Esser, Wettiner Str. 9, DDR-7010 Leipzig, all of German Democratic Rep.

[21] Appl. No.: 231,605

[22] Filed: Feb. 5, 1981

[51] Int. Cl.³ .............................................. H05H 1/26
[52] U.S. Cl. ............................... 373/18; 219/121 PR; 373/90
[58] Field of Search .......................... 373/93, 90, 18; 219/121 PR, 121 PP, 121 PN

[56] References Cited

U.S. PATENT DOCUMENTS

| 2,960,557 | 11/1960 | Beecher et al. | 373/93 |
| 4,024,337 | 5/1977 | Andersson et al. | 373/93 |
| 4,058,698 | 11/1977 | Bykhovsky et al. | 219/121 PR |
| 4,059,743 | 11/1977 | Esibian et al. | 219/121 PR |
| 4,121,042 | 10/1978 | Prenn | 373/93 |

FOREIGN PATENT DOCUMENTS 2900330  7/1979  German Democratic Rep. ... 373/90

Primary Examiner—Roy N. Envall, Jr.
Attorney, Agent, or Firm—Gabriel P. Katona

[57] ABSTRACT

The invention relates to a contact electrode for melting and heating furnaces with DC plasma heating wherein the flow body assures a uniform removal of heat over the entire end surface of the contact electrode, a temperature transmitter signals exceptional thermal loads, and a steel head is metallically connected as wear part to the end surface of the contact electrode.

2 Claims, 1 Drawing Figure

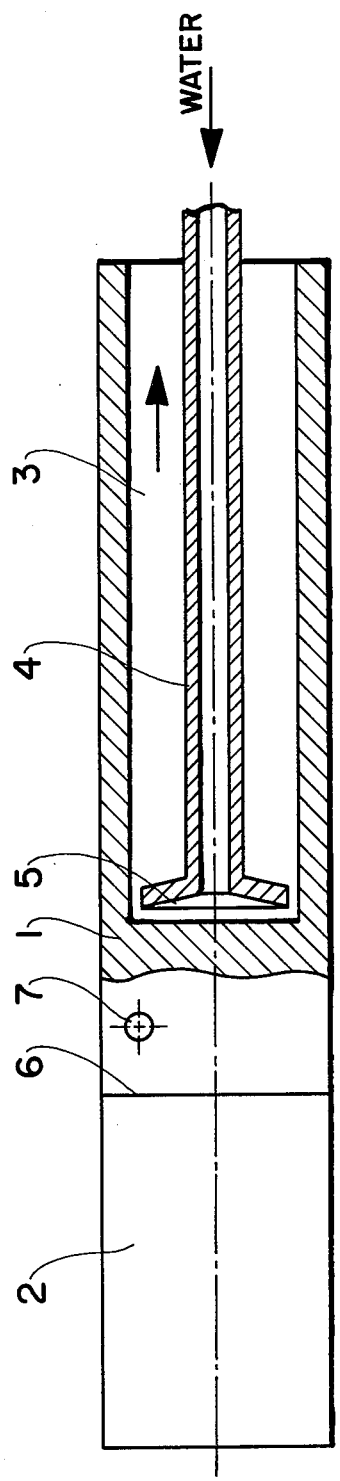

CONTACT ELECTRODE FOR MELTING AND HEATING FURNACES WITH DC PLASMA HEATING

BACKGROUND OF THE INVENTION

The present invention refers to melting and heating furnaces with DC plasma heating.

Contact electrodes provided with cooling by water or other fluids are known. They frequently have poor electric contact conditions as well as insufficient heat transfer and coolant-flow conditions, leading to a melting or destruction of the contact electrode.

In plasma melting furnaces of high current intensity the contact electrode is subjected to particularly strong thermal wear as a result of which its life is limited.

SUMMARY OF THE INVENTION

The object of the present invention is to create contact electrodes for melting and heating furnaces with DC plasma heating and high current intensities, preferably in the range of 10 to 40 kA, which have a long life, favorable heat transfer conditions and a low consumption of material.

In accordance with the invention this object is achieved in the manner that the flow body made of a corrosion resistant material assures a uniform removal of heat over the entire end surface of the contact electrode, that a temperature transmitter which signals extreme thermal loads is located below the end surface of the contact electrode and that a steel head is metallically connected as a wear part to the end surface of the contact electrode.

BRIEF DESCRIPTION OF THE DRAWING

The invention will be explained in further detail with reference to the drawing which is a partial sectional view of the contact electrode according to the invention.

DETAILED DESCRIPTION OF THE INVENTION

A steel head 2 which is developed as a wear part is metallically connected to the contact electrode 1. Within the bore 3 of the contact electrode 1 there is contained the flow body 4 which produces the uniform cooling of the end surface 6 of the contact electrode 1 by the special shape of its end surface 5. A temperature transmitter 7 is located below the end surface 6 to signal exceptional thermal loads.

We claim:

1. A contact electrode for melting and heating furnaces with DC heating, comprising a main body having a bore and an end surface adjacent the closed end of the bore, a flow body composed of a corrosion resistant material for ensuring an intensive cooling of the end surface and comprising a tube receptive of a coolant and having a conically flaring end surface facing the closed end of the bore and a temperature transmitter located on the main body between the end surface of the main body and the end surface of the flow body.

2. A contact electrode according to claim 1, further comprising a steel head connected as a wear part to the end surface of the main body.

* * * * *